(12) United States Patent
Nagaosa

(10) Patent No.: US 11,992,885 B2
(45) Date of Patent: May 28, 2024

(54) CHUCK-CLAW GUIDE STRUCTURE AND CHUCK-CLAW INSERTION METHOD

(71) Applicant: HOWA MACHINERY, LTD., Kiyosu (JP)

(72) Inventor: Hiroshi Nagaosa, Kiyosu (JP)

(73) Assignee: HOWA MACHINERY, LTD., Kiyosu (JP)

( * ) Notice: Subject to any disclaimer, the term of this patent is extended or adjusted under 35 U.S.C. 154(b) by 267 days.

(21) Appl. No.: 17/290,622

(22) PCT Filed: Oct. 29, 2019

(86) PCT No.: PCT/JP2019/042268
§ 371 (c)(1),
(2) Date: Apr. 30, 2021

(87) PCT Pub. No.: WO2020/090780
PCT Pub. Date: May 7, 2020

(65) Prior Publication Data
US 2021/0379674 A1 Dec. 9, 2021

(30) Foreign Application Priority Data

Oct. 30, 2018 (JP) ................................ 2018-203390

(51) Int. Cl.
*B23B 31/16* (2006.01)
*B23B 31/10* (2006.01)
*B23B 31/39* (2006.01)

(52) U.S. Cl.
CPC ............ *B23B 31/16* (2013.01); *B23B 31/102* (2013.01); *B23B 31/39* (2013.01); *B23B 2231/32* (2013.01); *Y10T 279/1993* (2015.01)

(58) Field of Classification Search
CPC ....... B23B 31/102; B23B 31/16; B23B 31/39; B23B 2231/32; Y10T 279/1993
See application file for complete search history.

(56) References Cited

U.S. PATENT DOCUMENTS 1,401,207 A * 12/1921 Swissgabel ............. B23B 31/16
279/123
2,920,896 A 1/1960 Buck
(Continued)

FOREIGN PATENT DOCUMENTS

CN 103363461 A 10/2013
CN 103817360 A * 5/2014 ............. B23B 31/16
(Continued)

OTHER PUBLICATIONS

Feb. 4, 2020 Search Report issued in International Patent Application No. PCT/JP2019/042268.

*Primary Examiner* — Eric A. Gates
(74) *Attorney, Agent, or Firm* — Oliff PLC

(57) ABSTRACT

A chuck-claw guide structure includes a guide-space delimiting part that delimits a guide space in communication with an attachment groove, and a regulation part provided on the guide-space delimiting part. The guide-space delimiting part has a contact surface configured to regulate the claw in contact therewith at a position along the attachment groove in a first direction. The regulation part is configured to regulate the claw at a position along the attachment groove in a second direction different from the first direction.

5 Claims, 7 Drawing Sheets

(56) References Cited

U.S. PATENT DOCUMENTS

| | | | | |
|---|---|---|---|---|
| 3,744,125 A | * | 7/1973 | Schalles | B23B 31/39 483/20 |
| 4,641,414 A | * | 2/1987 | Hiestand | B23B 31/39 29/563 |
| 4,686,757 A | * | 8/1987 | Hiestand | B23B 31/16279 82/124 |
| 5,174,589 A | * | 12/1992 | Gulde | B23B 31/16245 279/124 |
| 5,845,912 A | * | 12/1998 | Grupa | B23B 31/16275 279/124 |
| 7,963,527 B2 | * | 6/2011 | Weller | B23B 31/1627 279/121 |
| 7,980,565 B2 | * | 7/2011 | Rehm | B23B 31/32 279/124 |
| 9,492,874 B2 | | 11/2016 | Maurer | |
| 2015/0202691 A1 | * | 7/2015 | Kim | B23B 31/16279 279/110 |
| 2018/0185929 A1 | | 7/2018 | Ishikawa | |

FOREIGN PATENT DOCUMENTS

| | | | |
|---|---|---|---|
| CN | 204696574 U | | 10/2015 |
| DE | 612878 C | * | 5/1935 |
| DE | 656 664 C | | 2/1938 |
| GB | 148854 A | * | 5/1921 |
| JP | S60-249513 A | | 12/1985 |
| JP | 2014-237212 A | | 12/2014 |
| JP | 6185293 B2 | | 8/2017 |
| KR | 20150072321 A | * | 6/2015 |

* cited by examiner

CHUCK-CLAW GUIDE STRUCTURE AND CHUCK-CLAW INSERTION METHOD

TECHNICAL FIELD

The present invention relates to a chuck-claw guide structure for guiding a claw to be inserted into an attachment groove provided in a chuck body, and a chuck-claw insertion method for inserting a claw into an attachment groove.

BACKGROUND ART

The aforementioned chuck-claw guide structure is provided to be adapted to an attachment groove provided in a chuck body. A claw to be replaced is guided to the attachment groove by means of the guide structure so as to be inserted thereinto. In Patent Document 1, a positioning plate is installed on a base of a machine tool disposed on an outer circumferential side of a chuck. In order to insert a claw to be replaced into an attachment groove, a jaw holder (claw guide member) in which a jaw to be replaced is fitted is firstly attached to the positioning plate. Then, by rotating the chuck, an attachment position of the jaw holder of the positioning plate and the attachment groove of the claw of the chuck are aligned with each other. Thereafter, the jaw is moved toward the attachment groove of the chuck along a slide rail of the jaw holder.

Patent Document 1: JP6185293B

The above Patent Document 1 has a problem in that it takes a long time to adjust the alignment of the attachment position of the jaw holder attached to the positioning plate and a jaw attachment groove of the chuck, because the positioning plate and the chuck are distant from each other and/or the base of the machine tool is inclined.

Thus, in view of the above circumstances, the object of the present invention is to provide a chuck-claw guide structure and a chuck-claw insertion method that enable a claw to be replaced to be quickly moved toward an attachment groove.

DISCLOSURE OF THE INVENTION

The present invention provides a chuck-claw guide structure for guiding a claw to be inserted into an attachment groove provided in a chuck body, comprising:

a guide-space delimiting part that delimits a guide space in communication with the attachment groove, the guide-space delimiting part having a contact surface configured to regulate the claw in contact therewith at a position along the attachment groove in a first direction; and a regulation part provided on the guide-space delimiting part, the regulation part being configured to regulate the claw at a position along the attachment groove in a second direction different from the first direction.

In the aforementioned chuck-claw guide structure, a plurality of the regulation parts may be provided in the guide space at positions different from each other in an insertion direction of the claw.

In the aforementioned chuck-claw guide structure, the regulation part may have a curved surface that is convex toward an inside of the guide space.

In the aforementioned chuck-claw guide structure, the guide-space delimiting part may have a sidewall surface that is located more outside in the guide space than a distal end of the regulation part to define the guide space.

The aforementioned chuck-claw guide structure may further comprise a regulation support part movably provided on the guide-space delimiting part, and configured to support the regulation part.

In the aforementioned chuck-claw guide structure, the regulation support part may be threadedly engaged with the guide-space delimiting part.

The present invention provides a chuck-claw insertion method for inserting a claw into an attachment groove provided in a chuck body comprising:

a step of preparing the aforementioned chuck-claw guide structure;

a step of inserting the claw into the guide space, so that the claw is regulated by the contact surface at a position along the attachment groove in the first direction, and that the claw is regulated by the regulation part at a position along the attachment groove in the second direction; and a step of moving the claw from the guide space to the attachment groove to be inserted into the attachment groove.

The present invention can quickly move a claw to be replaced toward an attachment groove.

DESCRIPTION OF EMBODIMENTS

An embodiment of the present invention is described herebelow with reference to the drawings. In this embodiment, an example in which a chuck is secured to a spindle of a machine tool, such as an NC lathe, is described.

Figure 1:
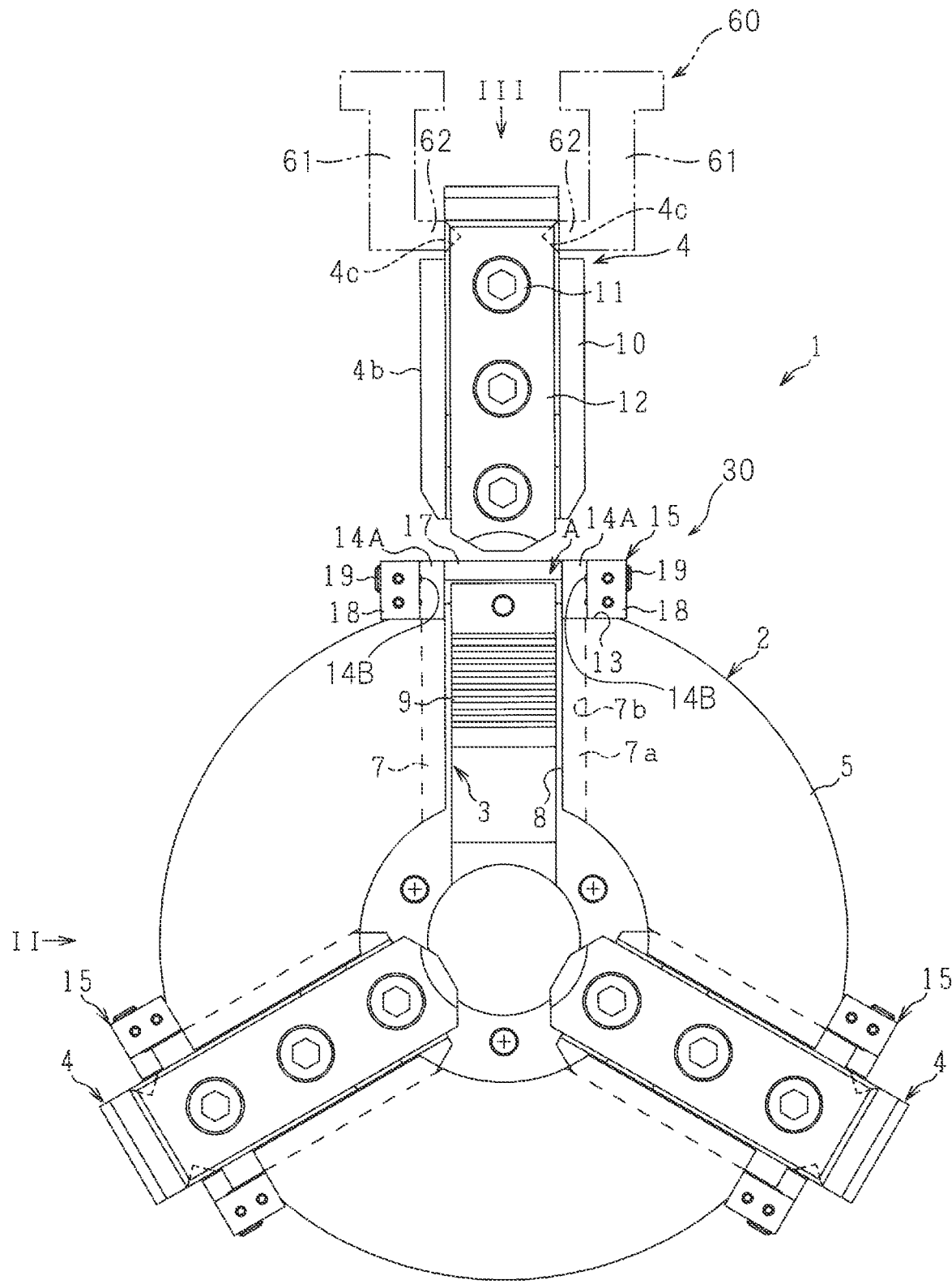
FIG. 1 is view showing a chuck comprising a guide structure according to an embodiment of the present invention.
Figure 2:
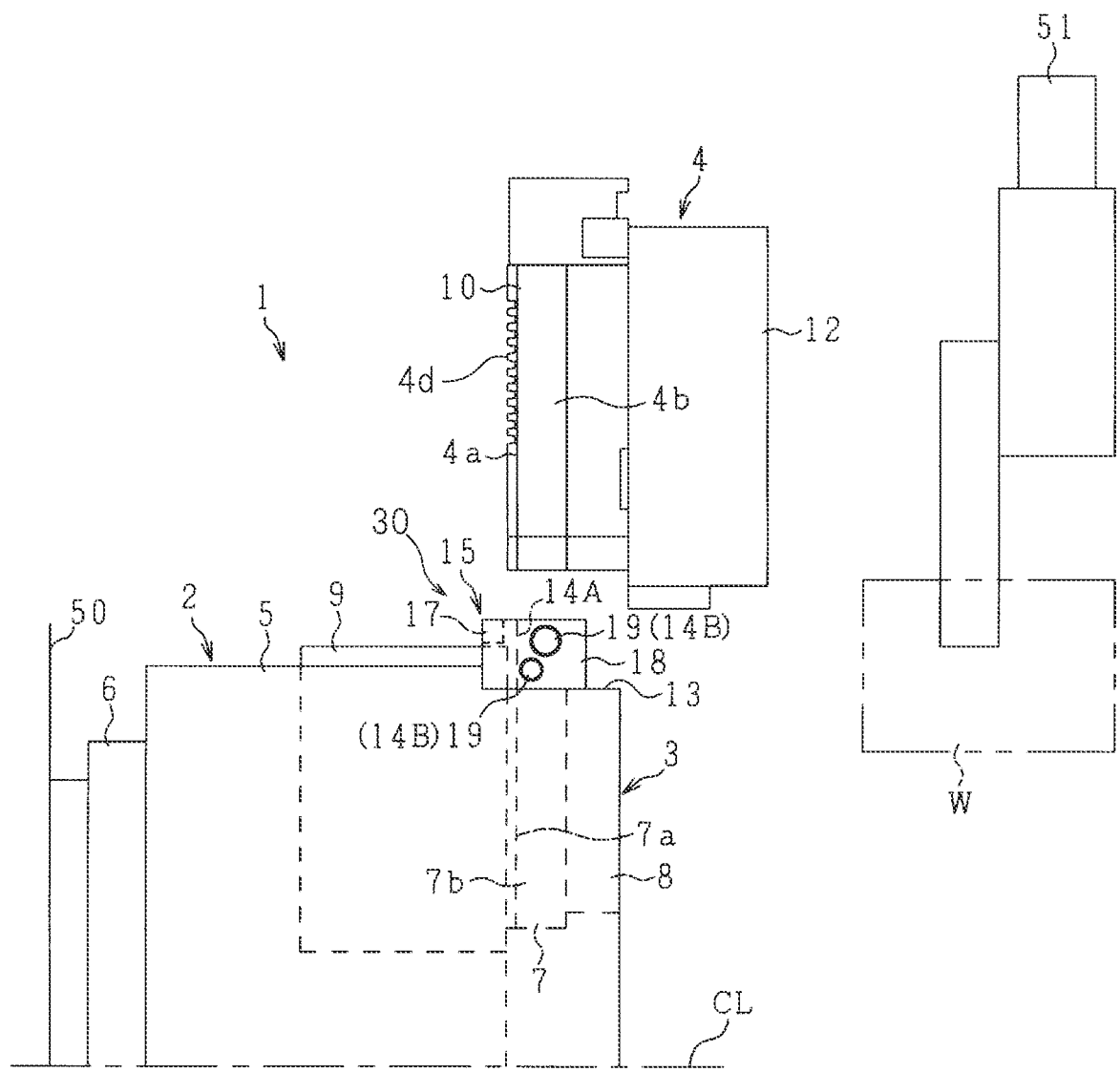
FIG. 2 is a view seen along an arrow II of FIG. 1.

As shown in FIGS. 1 and 2, a chuck 1 is secured to a spindle 50 of a machine tool, such as an NC lathe. A chuck body 2 of the chuck 1 has an attachment groove 3 (attachment position), and is configured to clamp a workpiece W by a claw 4 installed in the attachment groove 3. A workpiece W is conveyed by a loader 51, which is illustrated as a conveyance apparatus, for example, to the chuck 1. The workpiece W clamped by the chuck 1 is processed by moving a cutter holder with cutters (not shown) in front, rear, right and left directions. When a claw 4 is going to process another workpiece W having a different diameter or the claw 4 is worn out by longtime use, the claw 4 is replaced with another claw by hand or an automatic claw replacement apparatus 60.

Figure 3:
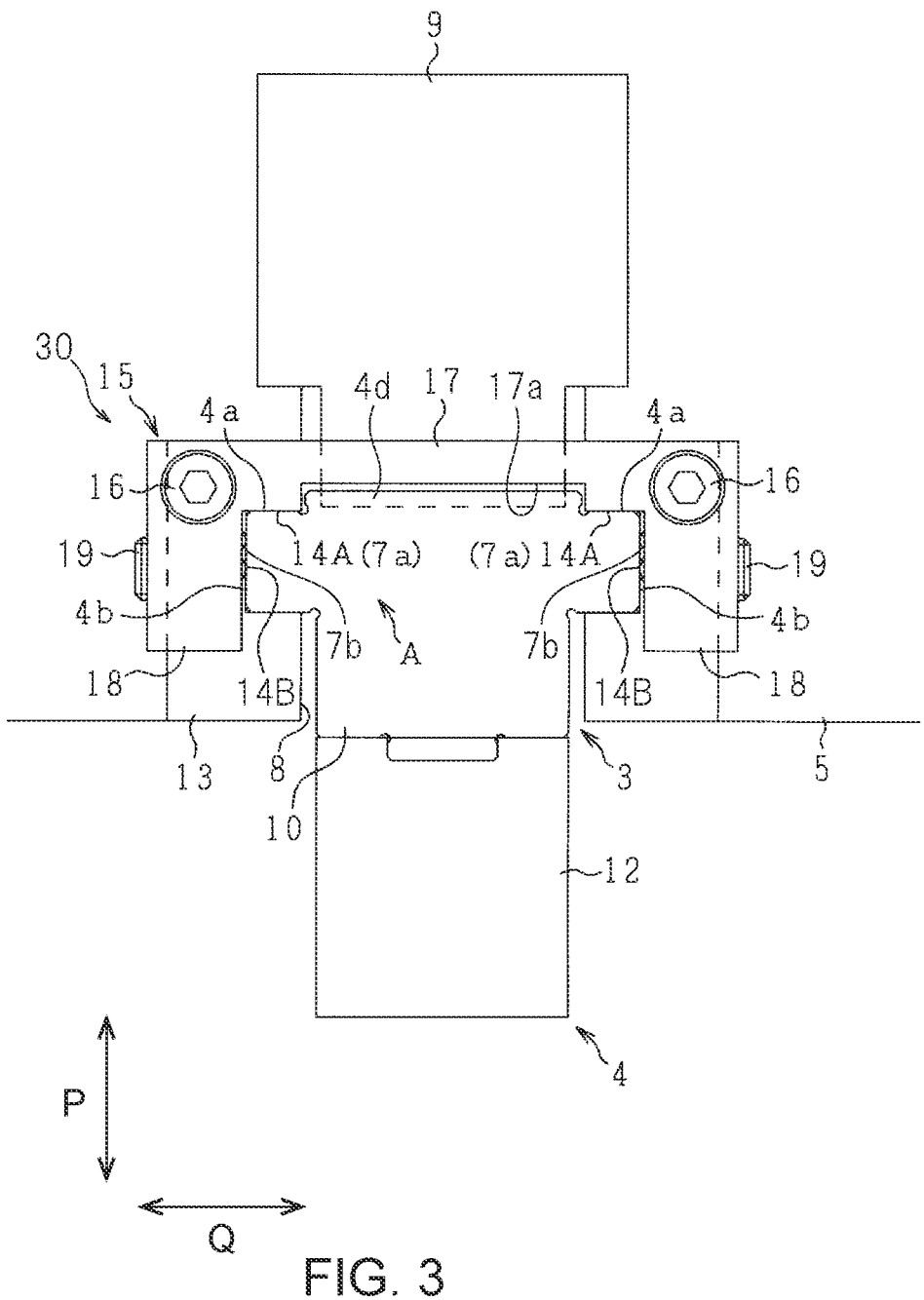
FIG. 3 is an enlarged view seen along an arrow III of FIG. 1.

The chuck body 2 comprises a front body 5, and a rear body 6 that closes a rear end surface of the front body 5 by an attachment bolt (not shown). An inner space (not shown) is formed inside the front body 5 and the rear body 6 of the chuck body 2. As shown in FIG. 1, the front body 5 has a plurality of (e.g., three) attachment grooves 3 illustrated as attachment positions, for example. The attachment grooves 3 are equidistantly disposed in a circumferential direction. As shown in FIGS. 2 and 3, each attachment groove 3 has a broader bottom part 7 having a T-shaped section, and an upper part 8 narrower than the bottom part 7. The attachment groove 3 is formed to extend in a perpendicular direction (radial direction) with respect to a chuck axis line CL. Namely, the bottom part 7 is a part of the attachment groove 3, which is formed rearward of the upper part 8 to extend radially. The upper part 8 is a part of the attachment groove 3, which is formed in front of the bottom part 7 to extend radially. In this specification, the right side in FIG. 2 is referred to as front side, and the left side is referred to as rear side.

A master jaw 9 is positioned on the front body 5 correspondingly to each attachment groove 3. A drive member (not shown) to be meshed with each master jaw 9 is disposed on the chuck axis line CL of the chuck body 2. The master jaw 9 is configured to be radially moved along the attachment groove 3 by the movement of the drive member. A locking mechanism (not shown) of the chuck body 2 couples a claw 4, which has been guided to the attachment groove 3, and the master jaw 9. The claw 4 includes a base jaw 10 having substantially the same cross-sectional shape as that of the attachment groove 3, and a top jaw 12 fixed to a front surface of the base jaw 10 by a plurality of bolts 11. In a state where the claw 4 is attached to the attachment groove 3, the base jaw 10 is inserted in the bottom part 7 and the upper part 8 of the attachment groove 3, and the top jaw 12 is positioned in front of the attachment groove 3.

A chuck-claw guide mechanism according to this embodiment (referrer to simply as guide structure 30 herebelow) is a structure for guiding the claw 4 to be inserted into the attachment groove 3 provided in the aforementioned chuck body 2.

As shown in FIG. 3, the guide structure 30 comprises a guide-space delimiting part 15 that delimits a guide space A in communication with the attachment groove 3, and a regulation part 14B provided in the guide space A. The guide-space delimiting part 15 has a contact surface 14A that regulates a claw 4 in contact therewith at a position along the attachment groove 3 in a first direction P. The regulation part 14B regulates the claw 4 at a position along the attachment groove 3 in a second direction Q different from the first direction P. In this embodiment, the first direction P corresponds to a direction along the chuck axis line CL, and the second direction Q corresponds to a direction perpendicular to the chuck axis line CL when seen in the radial direction. The second direction Q corresponds to the right and left direction in FIG. 3.

Such a guide structure 30 is described in more detail.

As shown in FIGS. 1 and 2, an attachment surface 13 is formed on an outer surface of the chuck body 2 at a position corresponding to each attachment groove 3 (outer circumferential position of attachment groove 3). The attachment surface 13 has a flat shape. As shown in FIG. 3, the guide-space delimiting part 15 is attached to the attachment surface 13 by bolts 16.

The guide-space delimiting part 15 includes a rear part 17 positioned rearward of the guide space A, and a projecting part 18 projecting from the rear part 17 toward the front side of the chuck body 2. In this embodiment, as shown in FIG. 3, the rear part 17 extends in the second direction Q, and the projecting parts 18 project from both ends of the rear part 17 forward (downward in FIG. 3). The projecting parts 18 are positioned on both sides of the guide space A in the second direction Q. The rear part 17 and the projecting parts 18 delimit the guide space A.

As shown in FIG. 3, the rear part 17 of the guide-space delimiting part 15 has the aforementioned contact surfaces 14A (contact part) with which a guide surface 4*a* of the claw 4 is brought to be into contact. When seen in the radial direction, a position of the guide-space delimiting part 15 is adjusted such that the contact surface 14A is aligned with a bottom surface 7*a* of the bottom part 7 of the attachment groove 3.

Figure 4:
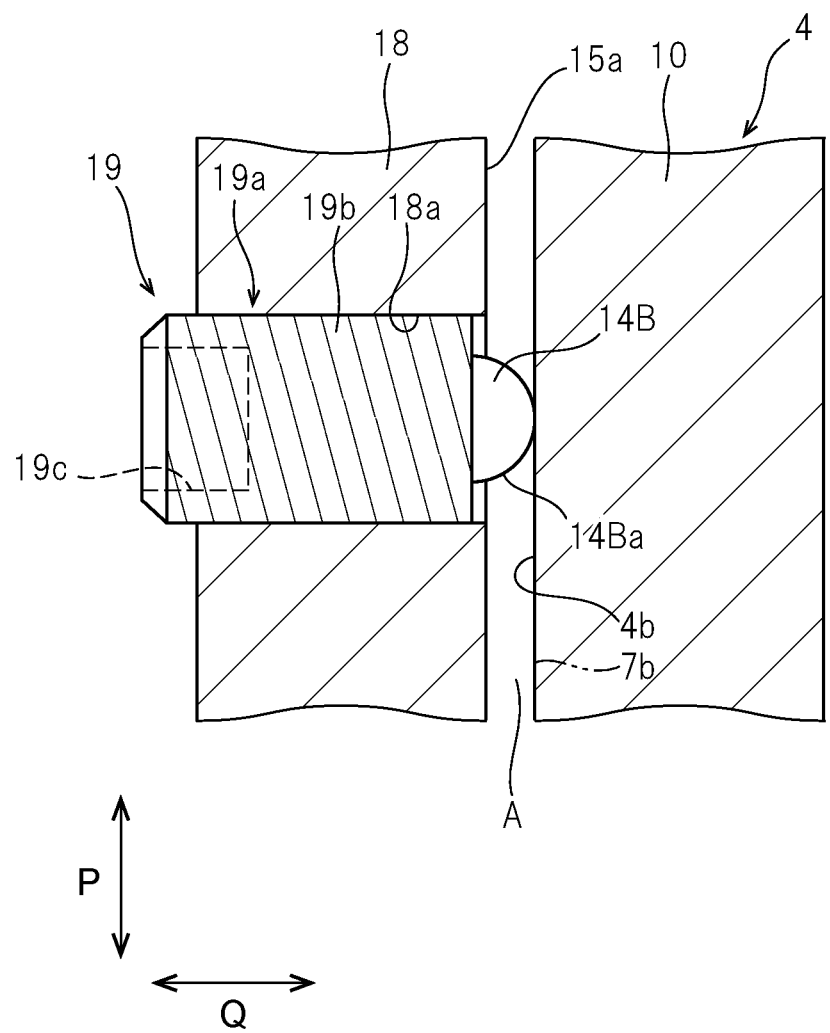
FIG. 4 is an enlarged sectional view of a set screw and its environment of FIG. 3.

As shown in FIGS. 3 and 4, the projecting part 18 on each of the right and left sides has the regulation part 14B (contact part) with which a side surface 4*b* of the claw 4 to be replaced is brought to be into contact. The regulation part 14B is attached to the projecting part 18 through a regulation support part 19*a*. In this embodiment, a set screw 19, which is illustrated as a combination of the regulation part 14B and the regulation support part 19*a*, for example, is attached to the projecting part 18. The regulation support part 19*a* is movably attached to the projecting part 18, and supports the regulation part 14B. The regulation support part 19*a* is a part of the set screw 19, which is other than the regulation part 14B. In this embodiment, the regulation part 14B and the regulation support part 19*a* are integrally formed with each other. The regulation support part 19*a* is threadedly engaged with the projecting part 18. Namely, the regulation support part 19*a* includes a threaded part 19*b* to be threaded engaged with a screw hole 18*a* formed in the projecting part 18, and a tool fitting part 19*c* into which a tool (not shown) can be fitted. A tool can be inserted into the tool fitting part 19*c* from outside the guide-space delimiting part 15. A distal end part of the set screw 19 is formed as the regulation part 14B. The side surface 4*b* is brought into contact with the regulation part 14B. A distal end of the regulation part 14B is adjusted to be aligned with a side surface 7*b* of the bottom part 7 of the attachment groove 3 when seen in the radial direction.

Thus, positions of the guide surfaces 4*a* and the side surfaces 4*b* of the claw 4 inserted in the guide space A can be aligned with the attachment groove 3 by the contact surface 14A and the regulation part 14B of the guide-space delimiting part 15.

As shown in FIG. 4, the guide-space delimiting part 15 may have a sidewall surface 15*a* that is positioned more outside in the guide space A (left side in FIG. 4) than the distal end of the regulation part 14B. The sidewall surface 15*a* delimits the guide space A. In this embodiment, when seen in the radial direction, the sidewall surfaces 15*a* are formed on both sides (right and left sides in FIG. 3) of the guide space A. The sidewall surface 15*a* is positioned more outside (left side in FIG. 4) than the side surface 7*b* of the bottom part 7 of the attachment groove 3 in the second direction Q.

In this embodiment, as shown in FIG. 3, a plurality of the aforementioned contact surfaces 14A may be provided on the rear part 17 of the guide-space delimiting part 15. In FIG. 3, two contact surfaces 14A are provided on the rear part 17, such that the contact surfaces 14A are located on both ends of the rear part 17 in the second direction Q. A rack recess 17*a* having a rearwardly recessed shape is provided between the two contact surfaces 14A. A rack 4*d* provided between the guide surfaces 4*a* of the claw 4 can be inserted into the rack recess 17*a*, so as to prevent the claw 4 from interfering with the guide-space delimiting part 15.

In this embodiment, as shown in FIG. 2, a plurality of the regulation parts 14B may be provided in the guide space A at positions different form each other in the insertion direction of the claw 4 (radial direction). In the example shown in FIG. 2, two set screws 19 each including the regulation part 14B are provided on the respective projecting parts 18. The two set screws 19 may be located at positions different from each other in a direction along the chuck axis line CL. In addition, the two set screws 19 each having the regulation part 14B may differ from each other in size.

As shown in FIG. 4, the regulation part 14B may have a curved surface 14Ba that is convex toward the inside of the guide space A. For example, the curved surface 14Ba may be a part of a spherical surface. The side surface 4b of the claw 4 comes into contact with the curved surface 14Ba, so that a position of the side surface 4b is regulated.

Next, a method of inserting the claw 4 of the chuck 1 into the attachment groove 3 provided in the chuck body 2 by using the guide structure 30 according to this embodiment having such a configuration is described. Herein, an example in which the claw 4 is inserted into the attachment groove 3 by using the automatic claw replacement apparatus 60 is described.

The claw 4 is first inserted into the guide space A of the aforementioned guide structure 30, so that the claw 4 is regulated by the regulation parts 14B to a position along the attachment groove 3 in the first direction P and the second direction Q. To be specific, as shown in FIG. 1, in a state where a projection 62 of a grasping claw 61 of the automatic claw replacement apparatus 60 is engaged with an engagement recess 4c of the claw 4, the claw 4 is lowered from a position above the guide space A to be inserted into the guide space A. Then, the guide surface 4a of the claw 4 comes into contact with the contact surface 14A of the rear part 17 of the guide-space delimiting part 15. Then, while the guide surface 4a is in contact with the contact surface 14A, the claw 4 is further lowered. Thus, the guide surface 4a of the claw 4 is located at a position along the bottom surface 7a of the bottom part 7 of the attachment groove 3 in the first direction P. Thereafter, the side surface 4b of the claw 4 comes into contact with the regulation part 14B of the set screw 19. While the guide surface 4a is in contact with the contact surface 14A and the side surface 4b is in contact with the regulation part 14B, the claw 4 is further lowered. In this manner, the side surface 4b of the claw 4 is located at a position along the side surface 7b of the bottom part 7 of the attachment groove 3 in the first direction P and the second direction Q.

Following thereto, the claw 4 is moved from the guide space A to the attachment groove 3 so as to be inserted into the attachment groove 3. In order thereto, the claw 4 is lowered to a desired position in the attachment groove 3, with the guide surface 4a of the claw 4 being in contact with the contact surface 14A and the side surface 4b of the claw 4 being in contact with the regulation part 14B.

In this manner, the claw 4 of the chuck 1 can be inserted into the attachment groove 3 provided in the chuck body 2.

After the claw 4 has been inserted into the attachment groove 3 to reach a desired position, the claw 4 inserted in the attachment groove 3 and the master jaw 9 are coupled by the locking mechanism (not shown) of the chuck body 2. Thereafter, the grasping claw 61 of the automatic claw replacement apparatus 60 is disengaged from the engagement recess 4c of the claw 4, and the grasping claw 61 is pulled up. In this manner, the claw 4 of the chuck 1 is attached to the attachment groove 3 provided in the chuck body 2. The guide structure 30 may be attached to the attachment surface 13 of the chuck body 2 before the claw 4 may be inserted into the attachment groove 3 of the chuck body 2, and then the guide structure 30 may be detached from the attachment surface 13, after the claw 4 has been attached to the attachment groove 3.

Since the chuck body 2 is provided with the guide-space delimiting part 15 having a plurality of the contact surfaces 14A and the regulation parts 14B with which the claw 4 to be replaced is brought to be into contact, the claw 4 can be moved toward the attachment groove 3 while the claw 4 is in contact with the contact surfaces 14A and the regulation parts 14B. In a conventional case where a positioning plate and a chuck are distant from each other, it takes a long time to adjust the alignment of an attachment position of a jaw holder attached to the positioning plate and a jaw attachment groove of the chuck. On the other hand, according to this embodiment, positions of the guide surfaces 4a and the side surfaces 4b of the claw to be replaced can be quickly adapted to the attachment groove 3. The provision of the chuck body 2 with the guide-space delimiting part 15 eliminates the necessity of storing a component for guiding claw (jaw holder) in another place as in conventional case. In addition, the guide-space delimiting part 15 is attached to the chuck body 2 such that the contact surfaces 14A and the regulation parts 14B can be moved in accordance with the attachment groove 3. Thus, by adjusting a position where the guide-space delimiting part 15 is attached, positions of the guide surfaces 4a and the side surfaces 4b of the claw 4 to be replaced can be adapted to the attachment groove 3. Further, the movable set screw 19 is provided on the guide-space delimiting part 15, and the claw 4 in contact with the set screw 19 is moved toward the attachment groove 3. Thus, the claw 4 can be smoothly moved.

Thus, according to this embodiment, the guide-space delimiting part 15, which delimits the guide space A in communication with the attachment groove 3 provided in the chuck body 2, has the contact surface 14A, and the regulation part 14B is provided in the guide space A. The contact surface 14A regulates the claw 4 at a position along the attachment groove 3 in the first direction P, and the regulation part 14B regulates the claw 4 at a position along the attachment groove 3 in the second direction Q. Thus, before the claw 4 is inserted into the attachment groove 3, the claw 4 can be located at a position aligned with the attachment groove 3. Thus, the claw 4 to be replaced can be quickly moved toward the attachment groove 3. In addition, since the guide space A is in communication with the attachment groove 3, the guide space A and the attachment groove 3 can be prevented from separating from each other. Thus, the claw 4 to be replaced can be quickly moved toward the attachment groove 3.

In addition, according to this embodiment, a plurality of the regulation parts 14B are provided in the guide space A at positions different from each other in the insertion direction of the claw 4. Thus, in a state where the claw 4 is regulated by the regulation parts 14B at positions along the attachment groove 3, the claw 4 can be inserted from the guide space A into the attachment groove 3. Thus, the claw 4 to be replaced can be quickly moved toward the attachment groove 3.

In addition, according to this embodiment, the regulation part 14B has the curved surface 14Ba that is convex toward the inside of the guide space A. Thus, the side surface 4b of the claw 4 can be easily regulated at a position along the side surface 7b of the attachment groove 3. Thus, the claw 4 to be replaced can be quickly moved toward the attachment groove 3.

In addition, according to this embodiment, the guide-space delimiting part 15 has the sidewall surface 15a that is positioned more outside in the guide space A than the distal end of the regulation part 14B to delimit the guide space A. Thus, the side surface 4b of the claw 4 in the guide space A can be brought into contact with the regulation part 14B, whereby the side surface 4b of the claw 4 can be prevented from contacting the sidewall surface 15a. Thus, the side surface 4b of the claw 4 can be easily regulated at a position along the side surface 7b of the attachment groove 3, and the claw 4 to be replaced can be quickly moved toward the attachment groove 3.

In addition, according to this embodiment, the guide-space delimiting part 15 has the regulation support part 19a which is movable and supports the regulation part 14B. Thus, by moving the regulation support part 19a with respect to the guide-space delimiting part 15, a position of the regulation part 14B can be adjusted to be along the side surface 7b of the attachment groove 3. As a result, the side surface 4b of the claw 4 can be regulated at a position along the side surface 7b of the attachment groove 3, and the claw 4 to be replaced can be quickly moved toward the attachment groove 3.

In addition, according to this embodiment, the regulation support part 19a is threadedly engaged with the guide-space delimiting part 15. Thus, the regulation support part 19a can be easily moved with respect to the guide-space delimiting part 15, and a position of the regulation part 14B can be easily adjusted to be along the side surface 7b of the attachment groove 3.

Figure 5:
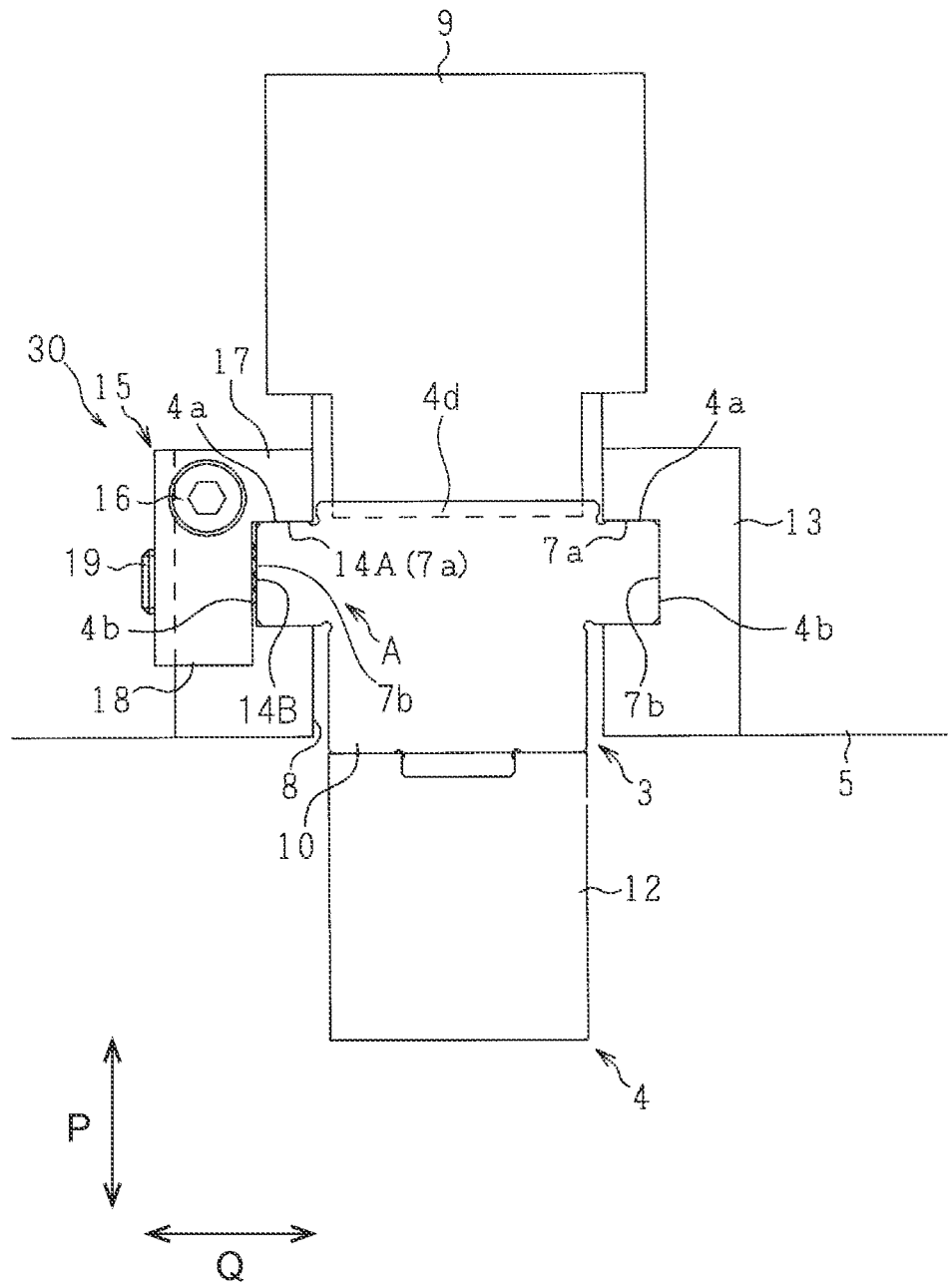
FIG. 5 is a view showing a modification example of a guide structure of FIG. 3.

As shown in a modification example shown in FIG. 5, the guide-space delimiting part 15 may be composed of the rear part 17 and one projecting part 18. In this case, the rear part 17 and this projecting part 18 define the guide space A for guiding a claw 4. The rear part 17 may be formed outside the rack 4d of the claw 4 (left side in FIG. 5). Also in this case, positions of the guide surfaces 4a and the side surfaces 4b of the claw 4 in the guide surface A can be adapted to the attachment groove 3 by the contact surface 14A and the regulation part 14B.

Figure 6:
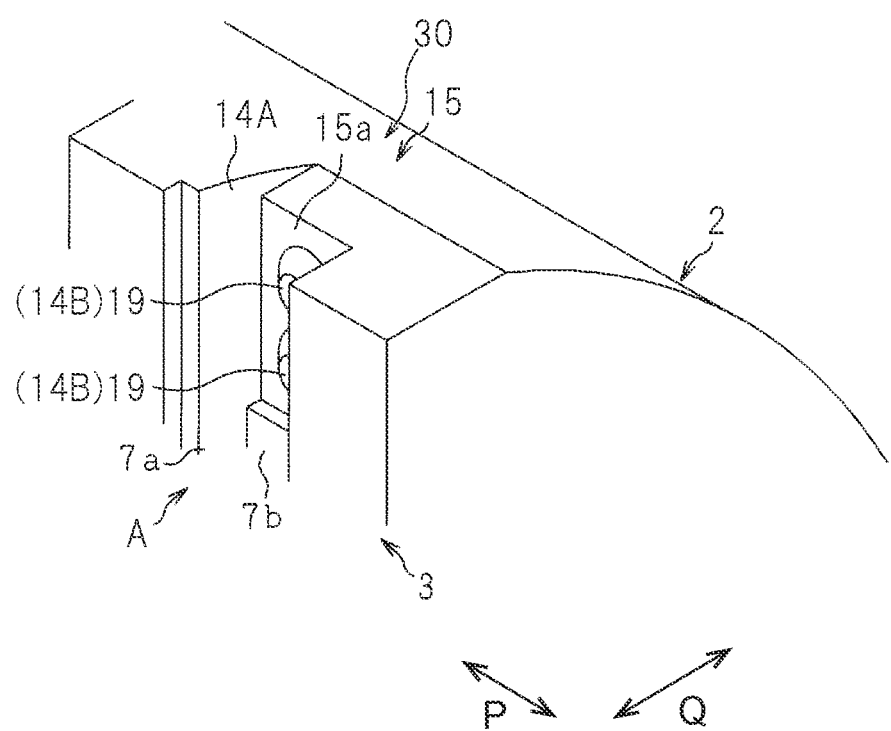
FIG. 6 is a view showing another modification example of the guide structure of FIG. 3.

In addition, as shown in a modification example shown in FIG. 6, the guide-space delimiting part 15 may be formed integrally with the chuck body 2. In other words, an outer circumferential portion of the attachment groove 3 in the chuck body 2 may serve as the guide-space delimiting part 15. In the modification example shown in FIG. 6, the contact surface 14A adapted to the bottom surface 7a of the bottom part 7 of the attachment groove 3 is provided on the outer circumferential portion (upper part) of the attachment groove 3. The contact surface 14A may be formed continuously to the bottom surface 7a and/or may be coplanar with the bottom surface 7a. The regulation support part 19a of the set screw 19 having the regulation part 14B is threadedly engaged with the chuck body 2. Also in this case, positions of the guide surfaces 4a and the side surfaces 4b of the claw 4 in the guide surface A can be adapted to the attachment groove 3 by the contact surface 14A and the regulation part 14B.

Figure 7:
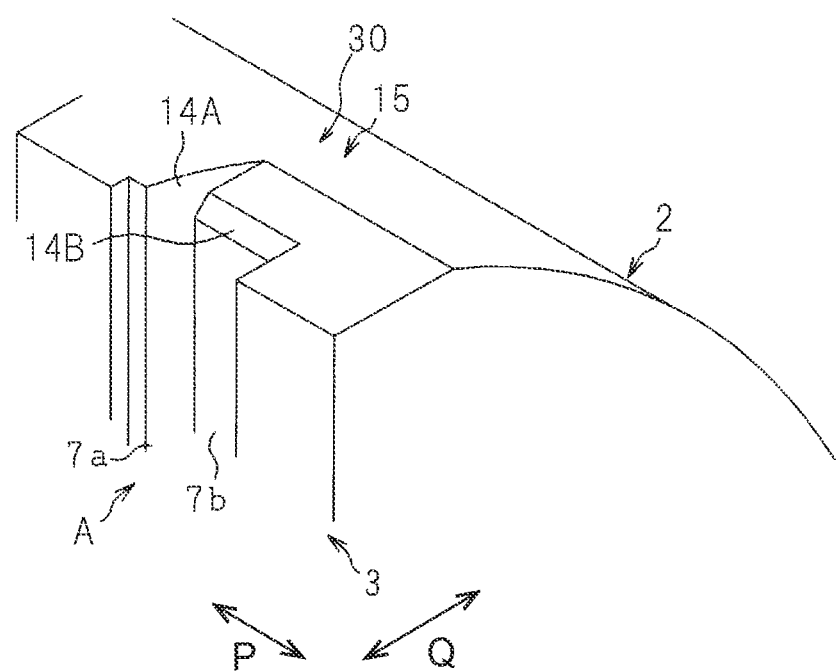
FIG. 7 is a view showing a modification example of FIG. 6.

A modification example shown in FIG. 7 differs mainly from the modification example shown in FIG. 6 in that no set screw 19 is used. As in the modification example shown in FIG. 7, the regulation part 14B may be formed as an inclined surface formed by a typical chamfer process. In this case, the inclined surface may have a chamfer dimension of 2 mm at an angle of 45° with respect to the side surface 7b. In the modification example shown in FIG. 7, the claw 4 in contact with the contact surface 14A, which is similar to the contact surface 14A shown in FIG. 6, is regulated by the contact surface 14A at a position along the attachment groove 3 in the first direction P. Simultaneously, the claw 4 in contact with the regulation part 14B, which is formed as the aforementioned inclined surface, is regulated by the regulation part 14B at a position along the attachment groove 3 in the second direction Q.

The present invention is not limited to the aforementioned embodiment, and a part of the structure thereof can be suitably modified within a range not exceeding from the scope of the present invention.

The invention claimed is:

1. A chuck-claw guide structure for guiding a claw to be inserted into an attachment groove provided in a chuck body, comprising:
    a guide-space delimiting part that delimits a guide space in communication with the attachment groove, the guide-space delimiting part having a contact surface configured to regulate the claw in contact therewith at a position along the attachment groove in a first direction;
    a regulation part provided on the guide-space delimiting part, the regulation part being configured to regulate the claw at a position along the attachment groove in a second direction perpendicular to the first direction and an insertion direction of the claw; and
    a regulation support part movably provided on the guide-space delimiting part, and configured to support the regulation part, wherein
    the regulation support part includes a threaded part which has a center axis line along the second direction and is threadedly engaged with the guide-space delimiting part.

2. The chuck-claw guide structure according to claim 1, wherein
    a plurality of the regulation parts are provided in the guide space at positions different from each other in the insertion direction of the claw.

3. The chuck-claw guide structure according to claim 1, wherein
    the regulation part has a curved surface that is convex toward an inside of the guide space.

4. The chuck-claw guide structure according to claim 1, wherein
    the guide-space delimiting part has a sidewall surface that is located more outside in the guide space than a distal end of the regulation part to define the guide space.

5. A chuck-claw insertion method for inserting a claw into an attachment groove provided in a chuck body comprising:
    a step of inserting the claw into the guide space of the chuck-claw guide structure according to claim 1, so that the claw is regulated by the contact surface at a position along the attachment groove in the first direction, and that the claw is regulated by the regulation part at a position along the attachment groove in the second direction; and
    a step of moving the claw from the guide space to the attachment groove to be inserted into the attachment groove.

* * * * *